United States Patent [19]

Nottingham et al.

[11] Patent Number: 5,004,882
[45] Date of Patent: Apr. 2, 1991

[54] MICROWAVABLE METAL BAKING PAN WITH INSULATING GIRDLE

[75] Inventors: John R. Nottingham; John W. Spirk, Jr., both of Moreland Hills; Paul E. Brokaw, Euclid, all of Ohio

[73] Assignee: G & S Metal Products Company, Inc., Cleveland, Ohio

[21] Appl. No.: 406,687

[22] Filed: Sep. 13, 1989

[51] Int. Cl.⁵ .............................................. H05B 6/80
[52] U.S. Cl. ..................... 219/10.55 E; 219/10.55 R; 99/DIG. 14; 16/114 A; 16/119; 294/31.2; 294/33
[58] Field of Search ................... 219/10.55 E, 10.55 F, 219/10.55 R, 10.55 M, 10.55 D; 294/31.2, 33, 34, 29, 27.1; 16/114 R, 114 A, 116 R, 119; 99/DIG. 14

[56] References Cited

U.S. PATENT DOCUMENTS

| | | | |
|---|---|---|---|
| 2,487,559 | 11/1949 | Kragmer | 16/114 A |
| 2,767,565 | 10/1956 | Ernst | 294/27.1 |
| 4,033,009 | 7/1977 | Hoinash | 99/DIG. 14 |
| 4,158,464 | 6/1979 | Bowen et al. | 294/31.2 |
| 4,552,276 | 11/1985 | Büch | 294/31.2 |
| 4,558,198 | 12/1985 | Levendusky et al. | 219/10.55 E |
| 4,560,850 | 12/1985 | Levendusky et al. | 219/10.55 E |

Primary Examiner—Philip H. Leung
Attorney, Agent, or Firm—Pearne, Gordon, McCoy & Granger

[57] ABSTRACT

A cooking utensil for use in a microwave or conventional oven is disclosed. The utensil comprises a metal baking pan of largely conventional design with a plastic ring or girdle fitted around the outside edge of the pan to space the pan from the oven walls. The girdle may be provided with an interior shoulder to accept a lip on the pan. A rib on the girdle extending above the shoulder may be used to capture the pan lip between the rib and the shoulder in a snap-fit arrangement. Additionally, the girdle may be used as a cool-to-the-touch handle with or without handle extensions.

8 Claims, 2 Drawing Sheets

MICROWAVABLE METAL BAKING PAN WITH INSULATING GIRDLE

BACKGROUND OF THE INVENTION

The invention relates to metal containers that can be used in both microwave and conventional ovens.

It has been generally promulgated that metal containers cannot, or should not, be used in microwave ovens for reasons of arcing and unsatisfactory cooking results. Various patents have disclosed means to effect exceptions to this general rule. These patents dictate significant constraints on the design of the metal pans and/or their manner of use.

U.S. Pat. Nos. 3,857,023 and 3,985,991 show the use of a shallow aluminum foil pan inside of a microwave permeable box. The box provides the environment for a vapor cycle heat exchange process that cooks the portion of the food shielded from the microwave energy by the foil pan.

U.S. Pat. Nos. 4,558,198 and 4,560,850 show the use of a shallow metal pan having an electrically-insulating and microwave-diffusing inner and outer continuous plastic coating. The pan is used in conjunction with a plastic lid that retains steam to help heat the food, and in the case of the latter patent, to force steam to flow under the pan from a hole in the center of the pan. The lid covering the edges of the pan also serves to space the pan from the oven's walls. The walls of the pan are specified to be curved and all junctions between surfaces are specified to be of substantial radius in order for the pan to function without arcing in a microwave oven.

All of the prior art devices require substantial divergence from the pans and techniques of conventional baking in order to produce satisfactory results. This additional complexity, whether perceived or actual, discourages many users from making full use of the time and energy saving capabilities of microwave baking.

SUMMARY OF THE INVENTION

The present invention is a cooking utensil for use in either a conventional oven or a microwave oven. The utensil comprises a metal baking pan or vessel of a largely conventional appearance, around which is attached an insulating band or girdle the serves as both a thermally insulated handle and an electrically insulating spacer to space the utensil from the sides of a microwave oven cooking cavity.

Unlike prior art devices, no special attention to rounding bends, corners or other transistions is required. The metal vessel may be of any non-lossy metal, for example, aluminum.

The girdle may be formed from a high-temperature electrically and thermally insulting plastic material capable of withstanding temperatures as high as 450° F., for example, unsaturated bulk molded polyester compound, BMC Corporation No. 1000, food grade.

In the preferred embodiment, the metal vessel is provided with a lip about its mouth. The girdle then engages the lip in a unique snap-fit arrangement, allowing the girdle to be used as a handle.

To achieve the snap-fit retention of the girdle, it is provided with an internal shoulder that engages the underside of the lip of the vessel and with one or more ribs that retain the lip between the ribs and the shoulder. The ribs are such that, during assemble, the lip may be forced by the upper side of the ribs and retained against the shoulder by the under side of the ribs. This snap-fit assembly makes the utensil easy and inexpensive to assemble.

In a microwave oven, the girdle/handle stays cool to the touch even if the metal vessel becomes hot from cooking food.

DESCRIPTION OF THE PREFERRED EMBODIMENTS

Figure 1:
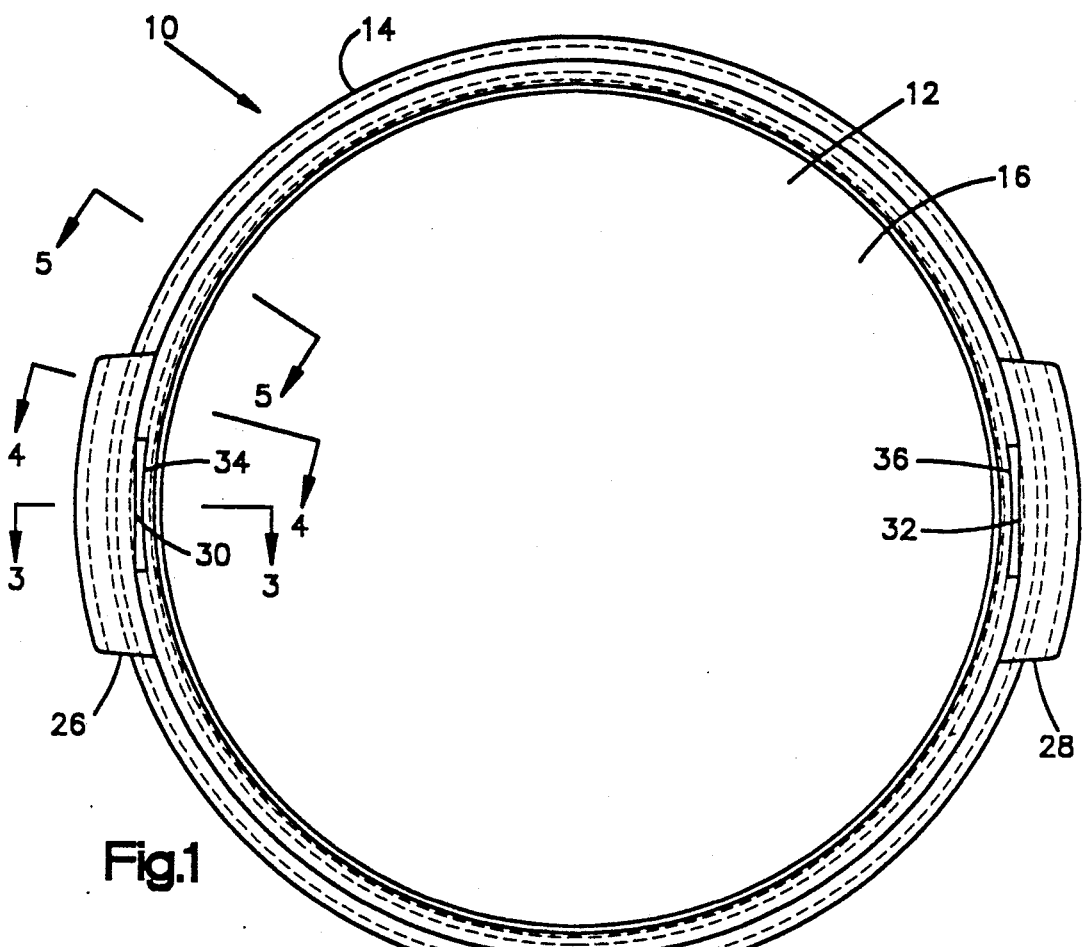
FIG. 1 is plan view of a cooking utensil according to the invention suitable for use as a circular cake pan.
Figure 2:
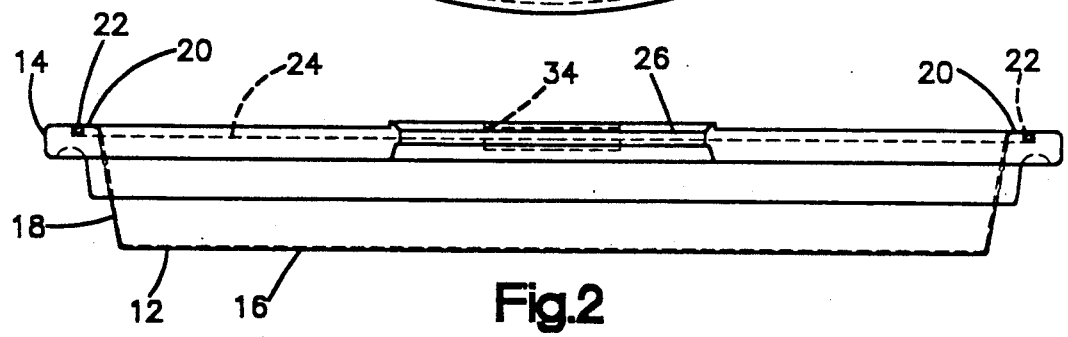
FIG. 2 is a side elevation of the utensil of FIG. 1.

Referring to FIGS. 1 and 2, a cooking utensil 10 according to the invention is shown.

The utensil 10 comprises a metal vessel or pan 12 and a girdle 14 of an electrically and thermally insulating material.

The pan 12 is of a circular design, having a flat bottom 16, a sloping side wall 18, and a lip 20 with a rolled edge 22. The pan may, for example, be about 9 inches in diameter and 1.5 inches in depth.

The pan 12 may be formed from any non-lossy metal, such as aluminum or stainless steel. The thickness of the material of the pan 12 is dictated by the desired structural strength versus economy. As will become apparent, pans of other shapes are also within the scope of the invention, the limitation being that the depth of the pan be less than 3.5 inches to allow sufficient penetration of microwave energy.

Figures 3, 4, 5:
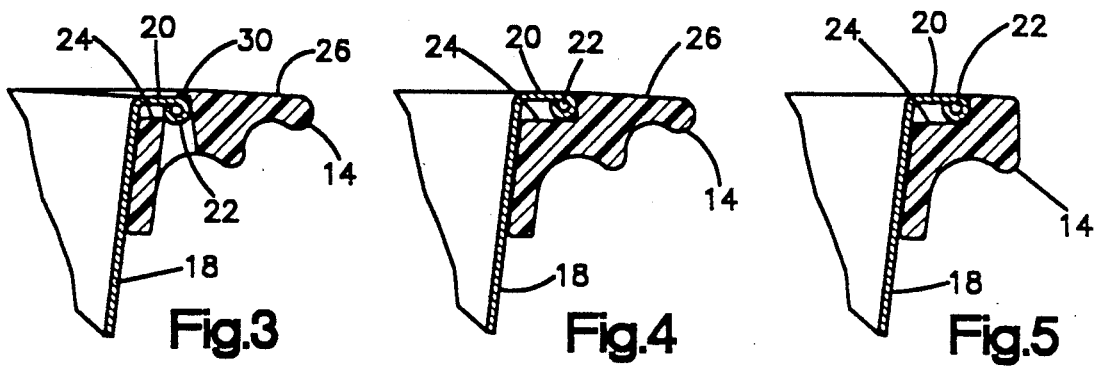
FIGS. 3, 4 and 5 are partial cross sectional views through line 3—3, 4—4 and 5—5, respectively.

The girdle 14 is dimensioned to engage the wall 18 near its top. As shown in FIGS. 3, 4 and 5, a shoulder 24 is provided at the inner periphery of the girdle 14. The shoulder 24 is dimensioned to just accommodate the outside diameter of the lip 20 and has a depth about equal to the thickness of the rolled edge 22.

The girdle 14 may be advantageously provided with grasping points or handle extensions 26, 28 extending horizontally from the periphery of the girdle 14. While, the girdle 14 could be made horizontally wider about its entire periphery, or the vessel 10 could be simply grasped anywhere on the periphery of the girdle 14, the provision of the extensions 26, 28 provide convenient, yet economical grasping points.

The girdle 14 may be retained on the pan 12 by the advantageous provision of one or more ribs 30, 32 on the girdle 14 extending above the shoulder 24.

In the preferred embodiment, the ribs 30, 32 are present only in the area of the slots 34, 36 and taper from minimum extension at the beginnings of the slots 34, 36 to maximum extension at their middle. FIG. 3 shows the rib 30 at the point of maximum extension.

The slots 34, 36 advantageously provide flexibility in the girdle 14 such that the ribs 30, 32 may be moved sufficiently out of the way of the lip 20 to allow assembly of the girdle 14 onto the pan 12.

During assembly, the lip 12 is forced by the ribs 30, 32 and seated against the shoulder 24. The ribs 30, 32 then serve to retain the lip 20 against the shoulder 24. The cooperation of the lip 20 with the ribs 30, 32 and the shoulder 24 provides for a snap-fit rentention of the girdle 14 on the pan 12.

The girdle 14 may be formed from a high-temperature electrically and thermally insulating plastic material capable of withstanding temperatures as high as 450° F., for example, unsaturated bulk molded polyester compound, BMC Corporation No. 1000, food grade.

If it is acceptable to limit the use of the utensil 10 to cooking in just microwave ovens, the girdle 14 may be formed of less heat-resistant materials than that required for used in conventional ovens.

It has been found that the girdle 14 need only space the pan 12 a minimal amount from the side walls of a microwave oven to prevent arcing. However, for durability, strength and appearance, a girdle 14 that extends horizontally beyond the lip 20 by about ¼ inch has proven satisfactory.

Not only does the girdle 14 prevent electrical arcing, when used in a microwave oven, it provides a cool-to-the-thouch handle, as only the pan 12 gets hot during the cooking process.

Rather than the continuous girdle 14, it is of course possible to attach discrete pieces of the insulating material about the periphery of the pan 12 to provide insulation from the side walls of the microwave oven and to provide cool-to-the-touch handles according to the invention. Such means as gluing or riveting the pieces to the pan 12 could be employed. Such discrete pieces should be spaced about the periphery of the pan 12 so that any tangent line at the periphery intersects adjacent pieces.

Figure 6:
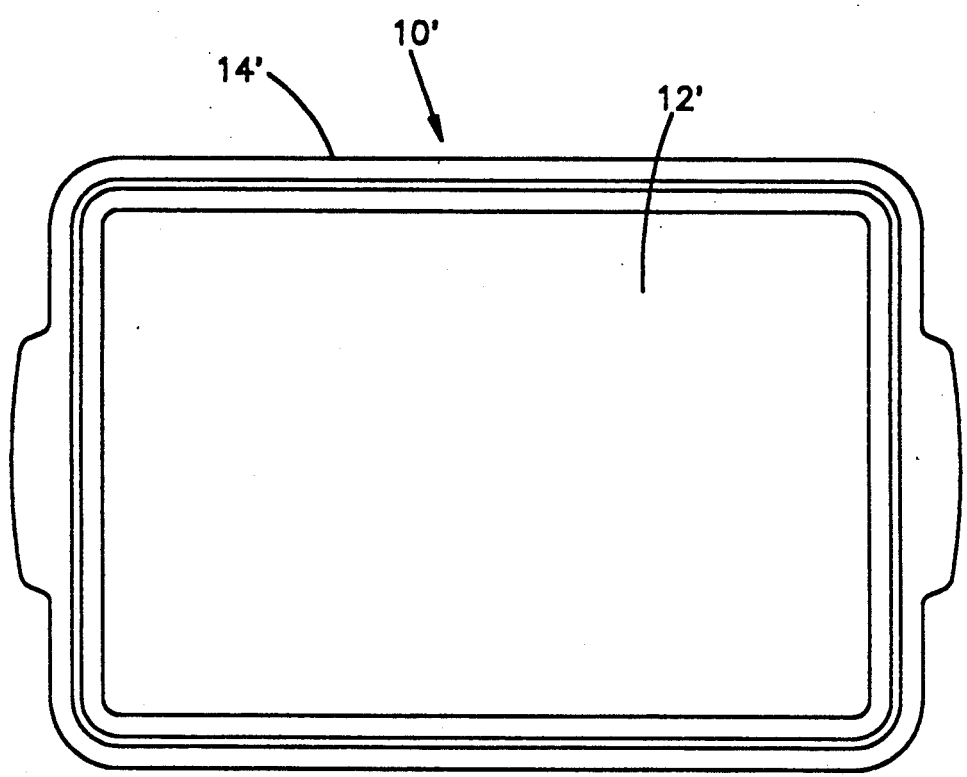
FIG. 6 is a plan view without hidden lines of an additional embodiment of the invention.

FIG. 6 shows an additional embodiment of the invention. A cooking utensil 10', having a generally rectangular shape, comprises a metal pan 12' and an insulating girdle 14'.

Figure 7:
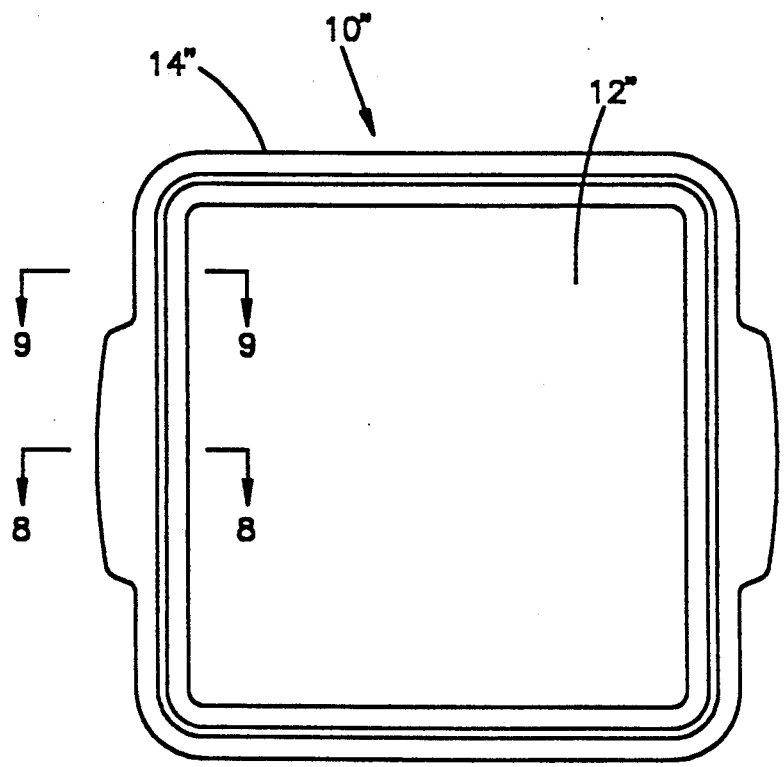
FIG. 7 is a plan view without hidden lines of an additional embodiment of the invention.

Similarly, referring to FIG. 7, a cooking utensil 10" having a generally square shape, comprises a metal pan 12" and an insulating girdle 14", The embodiments of FIGS. 6 and 7 correspond substantially to the embodiment of FIG. 1, except for their shape in plan view.

When used in a conventional oven, utensils according to the invention are conventional in every respect, except that the insulating girdle must not be subjected to temperatures beyond its physical limits (e.g. used as a broiler pan).

In a microwave oven, utensils according to the invention behave somewhat differently. The metal pan prevents penetration of microwaves from the bottom or sides of the pan. Energy may enter the food in the utensil only from the open mouth of the pan. Unlike in a conventional oven, food at the bottom and sides of the utensil are not cooked by heat conducted through the metal pan.

In the invention, this top-only irradiation slows the cooking process such that even cooking occurs without the use of lids or other aids. In cooking tests, cakes, muffins and similar items were produced that were evenly baked throughout.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A cooking utensil for use inside microwave or conventional ovens having side walls, said utensil comprising:
    a metal vessel having a lip encircling its mouth; and
    a girdle of a both electrically and thermally insulating material, said girdle encircling and fastened to said lip, whereby spacing of said vessel from the sides of said oven is provided about the entire lip, wherein said girdle includes:
    a shoulder receiving said lip; and
    a rib retaining said lip against said shoulder, whereby said girdle is snap-fit attached to said vessel.

2. A cooking utensil according to claim 1, wherein said girdle further comprises extensions of opposite sides of the periphery of the girdle, said extensions serving as handle.

3. A cooking utensil according to claim 1, wherein said vessel is a round pan.

4. A cooking utensil according to claim 3, wherein said vessel is about 1½ inches deep and about 9 inches in diameter.

5. A cooking utensil according to claim 1, wherein said vessel is a generally rectangular pan.

6. A cooking utensil according to claim 1, wherein said vessel is a generally square pan.

7. A cooking utensil according to claim 1, wherein the depth of said vessel is less than about 3½ inches.

8. A handle for a metal vessel for use inside microwave or conventional ovens having side walls, said vessel having a lip encircling its mouth, said handle comprising:
    a girdle of a both electrically and thermally insulating material, said girdle being adapted to encircle and fasteningly engage said lip, whereby spacing of said vessel from the sides of said oven is provided about the entire lip, wherein said girdle includes:
    a shoulder adapted to receive said lip; and
    a rib adapted to retain said lip against said shoulder, whereby said girdle may be snap-fit attached to said vessel.

* * * * *